United States Patent [19]
Tomoda et al.

[11] Patent Number: 5,214,097
[45] Date of Patent: May 25, 1993

[54] FLUORORUBBER COMPOSITION

[75] Inventors: Masayasu Tomoda; Shigeru Morita; Etsuo Minamino, all of Settsu; Eisuke Yamada, Nagoya; Hiroshi Okamoto, Owariasahi; Shinji Inagaki, Aichi; Junji Furukawa, Kawasaki, all of Japan

[73] Assignee: Daikin Industries Ltd., Osaka, Japan

[21] Appl. No.: 700,419

[22] Filed: May 15, 1991

[30] Foreign Application Priority Data

May 16, 1990 [JP] Japan .................................. 2-127758

[51] Int. Cl.$^5$ ...................... C08L 23/16; C08L 27/12; C08L 27/10; C08L 9/00
[52] U.S. Cl. ........................................ 525/94; 525/88; 525/92; 525/96
[58] Field of Search ......................... 525/94, 88, 92, 96

[56] References Cited

U.S. PATENT DOCUMENTS

| | | | |
|---|---|---|---|
| 3,519,703 | 7/1970 | Merkl et al. | 525/199 |
| 3,562,195 | 2/1971 | Reiner et al. | 525/199 |
| 4,931,499 | 6/1990 | Sakai et al. | 525/194 |

FOREIGN PATENT DOCUMENTS

| | | |
|---|---|---|
| 0138140 | 4/1985 | European Pat. Off. . |
| 0317346 | 5/1989 | European Pat. Off. . |
| 60-170629 | 9/1985 | Japan . |

*Primary Examiner*—Carman J. Seccuro, Jr.
*Attorney, Agent, or Firm*—Birch, Stewart, Kolasch & Birch

[57] ABSTRACT

A fluororubber composition comprising 100 parts by weight of a rubber mixture which comprises 5 to 70% by weight of at least one rubber selected from the group consisting of diene rubbers and polyolefin rubbers and 95 to 30 by weight of a fluororubber and 1 to 20 parts by weight of a block copolymer which comprises a vinyl monomer and a fluorovinyl monomer, which has good compatibility between the rubber components and gives a cured material having improved chemical resistance, heat resistance, oil resistance, and the like.

12 Claims, No Drawings

FLUORORUBBER COMPOSITION

BACKGROUND OF THE INVENTION

1. Field of the Invention

The present invention relates to a fluororubber composition. More particularly, the present invention relates to a rubber composition comprising a fluororubber and a diene or polyolefin base rubber, which composition has good compatibility and can provide a cured material having good chemical resistance, heat resistance and oil resistance at a low cost.

2. Description of the Related Art

A fluororubber has the best properties such as solvent resistance, heat resistance, chemical resistance or weather resistance among various rubbers. Since requirements for the properties of these rubbers have recently become more and more severe, a demand for the fluororubber is increasing.

However, the fluororubber has a large specific gravity and is very expensive, its application is limited.

To overcome such a drawback of the fluororubber, various proposals have been made for blending general rubbers with the fluororubber. For example, Japanese Patent Kokai Publication Nos. 50050/1080 and 101135/1985 disclose techniques for improving co-crosslinking properties of the rubbers, and Japanese Patent Kokai Publication No. 135843/1982 discloses a technique for improving the compatibility of the rubbers.

When the properties of the rubber blend are compared with those of the fluororubber as such, properties of recessive rubbers dominate so that the blend does not necessarily have the desired properties. This means that the co-crosslinking type polymer blend or the microdispersion technique is not satisfactory.

SUMMARY OF THE INVENTION

One object of the present invention is to improve a compatibility of a fluororubber with a diene or polyolefin base rubber.

Another object of the present invention is to provide a fluororubber composition having good chemical resistance, heat resistance and oil resistance.

According to the present invention, there is provided a fluororubber composition comprising 100 parts by weight of a rubber mixture which comprises 5 to 70% by weight of at least one rubber selected from the group consisting of diene rubbers and polyolefin rubbers and 95 to 30% by weight of a fluororubber and 1 to 20 parts by weight of a block copolymer which comprises a vinyl monomer and a fluorovinyl monomer.

DETAILED DESCRIPTION OF THE INVENTION

The block copolymer to be used in the present invention acts as a compatibilizer and improves a compatibility of the diene or polyolefin rubber with the fluororubber and properties of the cured material of the composition of the present invention.

Examples of the vinyl monomer contained in the block copolymer are styrene and its derivatives (e.g., α-methylstyrene, etc.), α-olefins (e.g., ethylene, propylene, butene-1, etc.), vinyl chloride, vinyl acetate, vinyl propionate, cyclic olefins (e.g., cyclohexene, etc.), vinyl ethers (e.g., methyl vinyl ether, etc.), allyl ether, methacrylates (e.g., methyl methacrylate, etc.), acrylates, and the like.

Examples of the fluorovinyl monomer are tetrafluoroethyl acrylate or methacrylate, pentafluoroethyl acrylate or methcrylate, vinyl fluoride, vinylidene fluoride, trifluoroethylene, tetrafluoroethylene, hexafluoropropylene, chlorotrifluoroethylene and the like.

A molar ratio of the vinyl monomer to the fluorovinyl monomer in the block copolymer is usually from 0.5:1 to 5:1, preferably from 0.8:1 to 4:1.

A preferred example of the block copolymer is a copolymer of the formula:

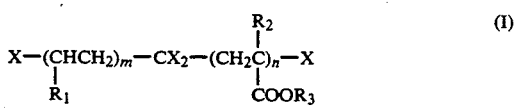

wherein X is a bromine atom or an iodine atom, $R_1$ is a hydrogen atom, a $C_1$-$C_6$ alkyl group or a phenyl group, $R_2$ is a hydrogen atom or a methyl group which may be substituted with 1 to 3 fluorine atoms, $R_3$ is a group of the formula:

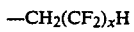

or

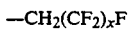

in which x is an integer of 1 to 5, and a ratio of m to n is from 0.5:1 to 5:1, which has a number average molecular weight of 500 to 100,000. Among the block copolymers, a block copolymer (I) in which X is a bromine atom, $R_1$ is a phenyl group, $R_2$ is a methyl group, $R_3$ is —$CH_2CF_2CF_2H$ or —$CH_2(CF_2)_xF$ is preferred.

The block copolymer can be prepared by a conventional method, namely a retelomerization method.

Examples of the diene rubber to be contained in the composition of the present invention are styrene/butadiene rubbers (SBR), acrylonitrile/butadiene rubbers (NBR), chloroprene rubbers, butadiene rubbers, isoprene rubbers, butyl rubbers, halogenated butyl rubbers, and the like.

Examples of the polyolefin rubber are ethylene/propylene rubbers, halogenated ethylene/propylene rubbers, ethylene/propylene/diene rubbers, halogenated ethylene/propylene/diene rubbers, and the like.

Examples of the fluororubber are vinylidene fluoride/hexafluoropropylene copolymers, vinylidene fluoride/tetrafluoroethylene/hexafluoropropylene copolymers which preferably have iodine and/or bromine atoms at chain ends, fluorophosphazene rubbers, fluorosilicone rubbers, tetrafluoroethylene/propylene rubbers, tetrafluoroethylene/propylene/vinylidene fluoride copolymers, tetrafluoroethylene/fluorovinyl ether copolymers, and the like.

The fluororubber composition of the present invention can be formulated as a crosslinkable composition by the addition of a known crosslinking agent which is a common crosslinking agent for both rubbers, such as peroxides, polyamines or polyhydroxy compounds (see, for example, Japanese Patent Kokai Publication No. 125491/1978). An amount of the crosslinking agent is from 0.1 to 10 parts by weight per 100 parts by weight of the rubbers in total.

The fluororubber composition of the present invention may contain a known additive such as a reinforcing filler, an extender, a dispersing aid, etc., which are disclosed in Japanese Patent Kokai Publication No. 294759/1989.

The fluororubber composition of the present invention can be prepared by a per se conventional method.

The fluororubber composition of the present invention is useful as a material of a packing, a sealing agent, an O-ring, an automobile part, a general industrial part and the like.

In comparison with a simple mixture of the diene or polyolefin rubber and the fluororubber, the fluororubber composition of the present invention has good roll processability and is easily molded.

The fluororubber composition of the present invention has good crosslinkability, and a crosslinked material has large tensile strength and tensile stress at 100% elongation but small elongation.

-continued

| Component | E-1 | E-2 |
|---|---|---|
| EPDM | 100 | 100 |
| DCPO | 2 | 2 |
| Block copolymer | — | 10 |

| Component | Fluororubber | | |
|---|---|---|---|
| | F-1 | F-2 | F-3 |
| DAIEL 902 | 100 | 100 | 100 |
| Block copolymer | — | 10 | 15 |

Notes:
DCPO: Dicumyl peroxide.
SBR: SBR 1502 manufactured by Nippon Synthetic Rubber Co., Ltd.
Block copolymer: Block copolymer (I) wherein X is a bromine atom, $R_1$ is a phenyl group, $R_2$ is a methyl group, $R_3$ is $-CH_2CF_2CF_2H$, m:n is 3.6:1.
EPDM: EP 22 manufactured by Nippon Synthetic Rubber Co., Ltd.
DAIEL 902: A vinylidene fluoride/tetrafluoroethylene/hexafluoropropylene copolymer manufactured by Daikin Industries Ltd (trademark)

TABLE 1

| Example No. | 1 | 2 | 3 | 4 | 5 | 6 | C.1 | C.2 | C.3 |
|---|---|---|---|---|---|---|---|---|---|
| S-1 | 20 | 20 | | | | | 20 | | |
| S-2 | | | 20 | | | | | | |
| S-3 | | | | 20 | | | | | |
| E-1 | | | | | | | | 20 | 10 |
| E-2 | | | | | 20 | 10 | | | |
| F-1 | | | 80 | 80 | 80 | | 80 | 80 | 90 |
| F-2 | 80 | | | | | 90 | | | |
| F-3 | | 80 | | | | | | | |
| Tensile strength (MPa) | 11 | 11.5 | 9.5 | 10.5 | 7.5 | 12.8 | 6 | 4.5 | 7.8 |
| Elongation (%) | 230 | 270 | 220 | 220 | 360 | 430 | 275 | 290 | 350 |
| $M_{100}$ (MPa) | 3 | 2.2 | 3 | 3 | 1 | 1.1 | 2.5 | 1 | 1 |

PREFERRED EMBODIMENTS OF THE INVENTION

The present invention will be illustrated by following Examples.

In Examples, the properties were measured or evaluated as follows:

Physical properties of the crosslinked material are evaluated according to JIS K6301.

Resistance to heat aging is evaluated by heating the crosslinked material at 175° C. for 72 hours, cooling it to room temperature, measuring the physical properties and then calculating a percentage change.

Oil resistance is evaluated by dipping the crosslinked material in an ASTM No. 3 oil at 70° C. for 48 hours and measuring a volume change percentage.

Compression set is measured with an O-ring (P-24) from the composition after keeping it at 150° C. for 72 hours under 25% compression.

EXAMPLES 1-6 AND COMPARATIVE EXAMPLES 1-3

Each rubber compound was prepared according to the following formulations wherein "parts" are by weight, and then the rubber compound was mixed in a ratio shown in Table 1 and press cured at 160° C. for 30 minutes. Physical properties of the crosslinked (cured) material were measured and the results are shown in Table 1.

| Component | Styrene rubber | | |
|---|---|---|---|
| | S-1 | S-2 | S-3 |
| SBR | 100 | 100 | 100 |
| DCPO | 2 | 2 | 2 |
| Block copolymer | — | 10 | 15 |

| Olefin rubber |

EXAMPLE 7 AND COMPARATIVE EXAMPLES 4-6

EPDM which was the same as one used in Example 1 and Daiel (trademark) 801 (a vinylidene fluoride/hexafluoropropylene copolymer manufactured by Daikin Industries Ltd.) in a ratio shown in Table 2 were kneaded on open rolls and press cured at 160° C. for 20 minutes. Physical properties of the cured material were measured. The results are shown in Table 2.

TABLE 2

| Example No. | C.4 | C.5 | 7 | C.6 |
|---|---|---|---|---|
| Blend ratio (EPDM/G 801) | 100/0 | 20/80 | 20/80 | 0/100 |
| Block copolymer | — | — | 10 | — |
| Siest 116 | 50 | 40 | 40 | 20 |
| ZnO | 5 | 5 | 5 | — |
| Stearic acid | 1 | 1 | 1 | 1 |
| DCPO | 2.8 | 1.9 | 1.9 | 1.5 |
| TAIC | — | 3.2 | 3.2 | 4 |
| Balnock DGM | 3.5 | 0.4 | 0.4 | — |
| Antiaging MB | 2 | 1 | 1 | — |
| Dry properties $M_{100}$ (kg/cm$^2$) | 28 | 63 | 67 | 61 |
| TB (kg/cm$^2$) | 132 | 152 | 175 | 242 |
| EB (%) | 350 | 340 | 280 | 330 |
| Hs | 70 | 85 | 84 | 77 |
| After aging properties $M_{100}$ (kg/cm$^2$) | −9.7 | +22.2 | +20.1 | +22 |
| TB (kg/cm$^2$) | −12.2 | +1.3 | +5.0 | +10.2 |
| EB (%) | +11.4 | +5.9 | +5.4 | +8.8 |
| Hs (points) | +3 | +5 | +5 | +2 |
| Oil resistance ΔV (%) | 152 | 27 | 20 | 0.6 |

TABLE 2-continued

| Example No. | C.4 | C.5 | 7 | C.6 |
| --- | --- | --- | --- | --- |
| Compression set (%) | 72 | 40 | 31 | 18 |

Notes:
Siest 116: MAF carbon (manufactured by Tokai Carbon Co., Ltd.).
Balnock DGM: Main component: p,p'-dibenzoylquinone dioxime (manufactured by Ouchi Shinko Kagaku Co., Ltd.).
Antiaging MG: Main component: mercaptobenzimidazole (manufactured by Kawagushi Chemical Co., Ltd.).

What is claimed is:

1. A fluororubber composition comprising 100 parts by weight of a rubber mixture which comprises 5 to 70% by weight of at least one rubber selected from the group consisting of diene rubbers and monoolefin copolymer rubbers optionally containing diene monomers or halogenated products thereof and 95 to 30% by weight of a fluororubber and 1 to 20 parts by weight of a block copolymer which comprises a vinyl monomer which does not contain fluorine and a fluorovinyl monomer, wherein a total percentage of the rubbers is 100%.

2. The fluororubber composition according to claim 1, wherein a molar ratio of said vinyl monomer to said fluorovinyl monomer in said block copolymer is from 0.5:1 to 5:1.

3. The fluororubber composition according to claim 2, wherein said molar ratio is from 0.8:1 to 4:1.

4. The fluororubber composition according to claim 1, wherein said block copolymer is a copolymer of the formula:

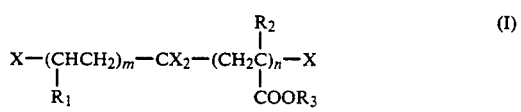

wherein X is a bromine atom or an iodine atom, $R_1$ is a hydrogen atom, a $C_1$-$C_6$ alkyl group or a phenyl group, $R_2$ is a hydrogen atom or a methyl group which may be substituted with 1 to 3 fluorine atoms, $R_3$ is a group of the formula:

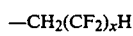

or

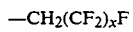

in which x is an integer of 1 to 5, and a ratio of m to n is from 0.5:1 to 5:1.

5. The fluororubber composition according to claim 4, wherein said block copolymer has a number average molecular weight of 500 to 100,000.

6. The fluororubber composition according to claim 5, wherein, in the formula (I), X is a bromine atom, $R_1$ is a phenyl group, $R_2$ is a methyl group and $R_3$ is —$CH_2CF_2CF_2H$ or —$CH_2(CF_2)_xF$.

7. The fluororubber composition according to claim 1, wherein said vinyl monomer is selected from the group consisting of styrene or a derivative thereof, an α-olefin, vinyl chloride, vinyl acetate, vinyl propionate, a cyclic olefin, a vinyl ether, allyl ether, a methacrylate and an acrylate.

8. The fluororubber composition according to claim 1, wherein said fluorovinyl monomer is selected from the group consisting of tetrafluoroethyl acrylate or methacrylate, pentafluoroethyl acrylate or methacrylate, vinyl fluoride, vinylidene fluoride, trifluoroethylene, tetrafluoroethylene, hexafluoropropylene and chlorotrifluoroethylene.

9. The fluororubber composition according to claim 1, wherein said diene rubbers are each a member selected from the group consisting of a styrene/butadiene rubber, an acrylonitrile/butadiene rubber, a chloroprene rubber, a butadiene rubber, an isoprene rubber, a butyl rubber and a halogenated butyl rubber.

10. The fluororubber composition according to claim 1, wherein said monoolefin copolymer rubbers are each a member selected from an ethylene/propylene and an ethylene/propylene/diene rubber.

11. The fluororubber composition according to claim 1, wherein said fluororubber is selected from the group consisting of a vinylidene fluoride/hexafluoropropylene copolymer, a vinylidene fluoride/tetrafluoroethylene/hexafluoropropylene copolymer, a fluorophosphazine rubber, a fluorosilicone rubber, a tetrafluoroethylene/propylene rubber, a tetrafluoroethylene/propylene/vinylidene fluoride copolymer and a tetrafluoroethylene/fluorovinyl ether copolymer.

12. The fluororubber composition according to claim 11, wherein each of said vinylidene fluoride/hexafluoropropylene copolymer and vinylidene fluoride/tetrafluoroethylene/hexafluoropropylene copolymer has iodine and/or bromine atoms at chain ends.

* * * * *